United States Patent [19]

Matsunaga

[11] Patent Number: 5,751,960
[45] Date of Patent: May 12, 1998

[54] ELECTRONIC MAIL SYSTEM USING DOUBLE FORWARDING SUPPRESSING FUNCTION FOR ADMINISTRATING ELECTRONIC MESSAGE THAT HAVING DATA FORMAT THAT CAN NOT BE HANDLED AT DESTINATION SIDE

[75] Inventor: Ryotaro Matsunaga, Kawasaki, Japan

[73] Assignee: Fujitsu Limited, Kawasaki, Japan

[21] Appl. No.: 301,399

[22] Filed: Sep. 8, 1994

[30] Foreign Application Priority Data

Dec. 3, 1993 [JP] Japan .................. 5-339435

[51] Int. Cl.⁶ ............................................. G06F 13/00
[52] U.S. Cl. ........................ 395/200.36; 395/200.62; 395/200.75; 379/207
[58] Field of Search ........................ 379/67, 88, 89, 379/93, 100, 207; 358/402, 400; 364/DIG. 1, 284.3, 284, DIG. 2; 395/500, 200.46, 200.62, 200.75

[56] References Cited

U.S. PATENT DOCUMENTS

| | | | |
|---|---|---|---|
| 4,754,428 | 6/1988 | Schultz et al. | 395/200.18 |
| 5,018,194 | 5/1991 | Suzuki et al. | 379/207 |
| 5,202,977 | 4/1993 | Pasetes, Jr. et al. | 395/500 |
| 5,283,887 | 2/1994 | Zachery | 395/500 |
| 5,313,614 | 5/1994 | Goettelmann et al. | 395/500 |
| 5,327,534 | 7/1994 | Hutchison et al. | 395/200.1 |
| 5,410,675 | 4/1995 | Shreve et al. | 395/500 |
| 5,418,908 | 5/1995 | Keller et al. | 395/200 |
| 5,446,896 | 8/1995 | Hegarty et al. | 395/650 |
| 5,487,100 | 1/1996 | Kane | 379/57 |
| 5,557,780 | 9/1996 | Edwards et al. | 395/500 |

FOREIGN PATENT DOCUMENTS

| | | |
|---|---|---|
| A2-1659 | 1/1990 | Japan . |
| A4-186945 | 7/1992 | Japan . |

OTHER PUBLICATIONS

Debenham, "Coomunications Support for EDI", 1991, pp. 1-3.

Primary Examiner—Thomas C. Lee
Assistant Examiner—Le Hien Luu
Attorney, Agent, or Firm—Staas & Halsey

[57] ABSTRACT

A method and an apparatus for administrating electric mails in linking an electronic mail systems among electronic mail systems. The object is to hold the electronic mail message in the user ID means of the forwarding side when it is requested to forward an electronic mail message in a data format that cannot be handled by the electronic mail system of the destination of forwarding. In the method of linking electronic mail systems which forwards an electronic mail message from an electronic mail system of the forwarding side having a function for suppressing double forwarding to another electronic mail system, when the electronic mail message being forwarded is of a format that cannot be handled by the electronic mail system which is the destination of forwarding, the electronic mail message forwarded to a linking ID means in the electronic mail system of the forwarding side is transmitted to another linking ID means in the same electronic mail system, and the electronic mail message is forwarded from this another ID means to the user ID means of the forwarding side.

13 Claims, 7 Drawing Sheets

FLOW OF BINARY MAIL: TRANSMISSION ——→
FORWARDING ———→

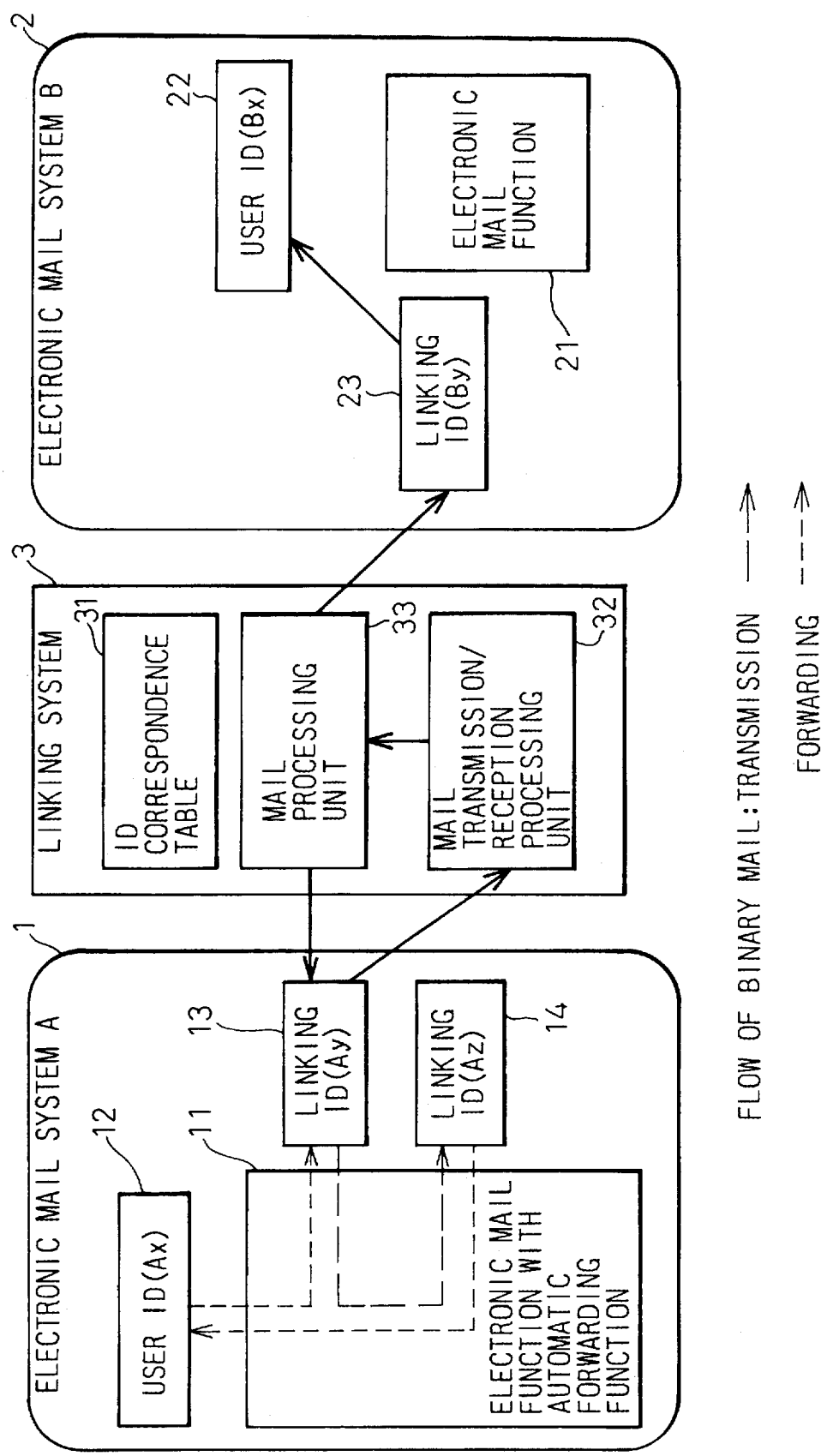

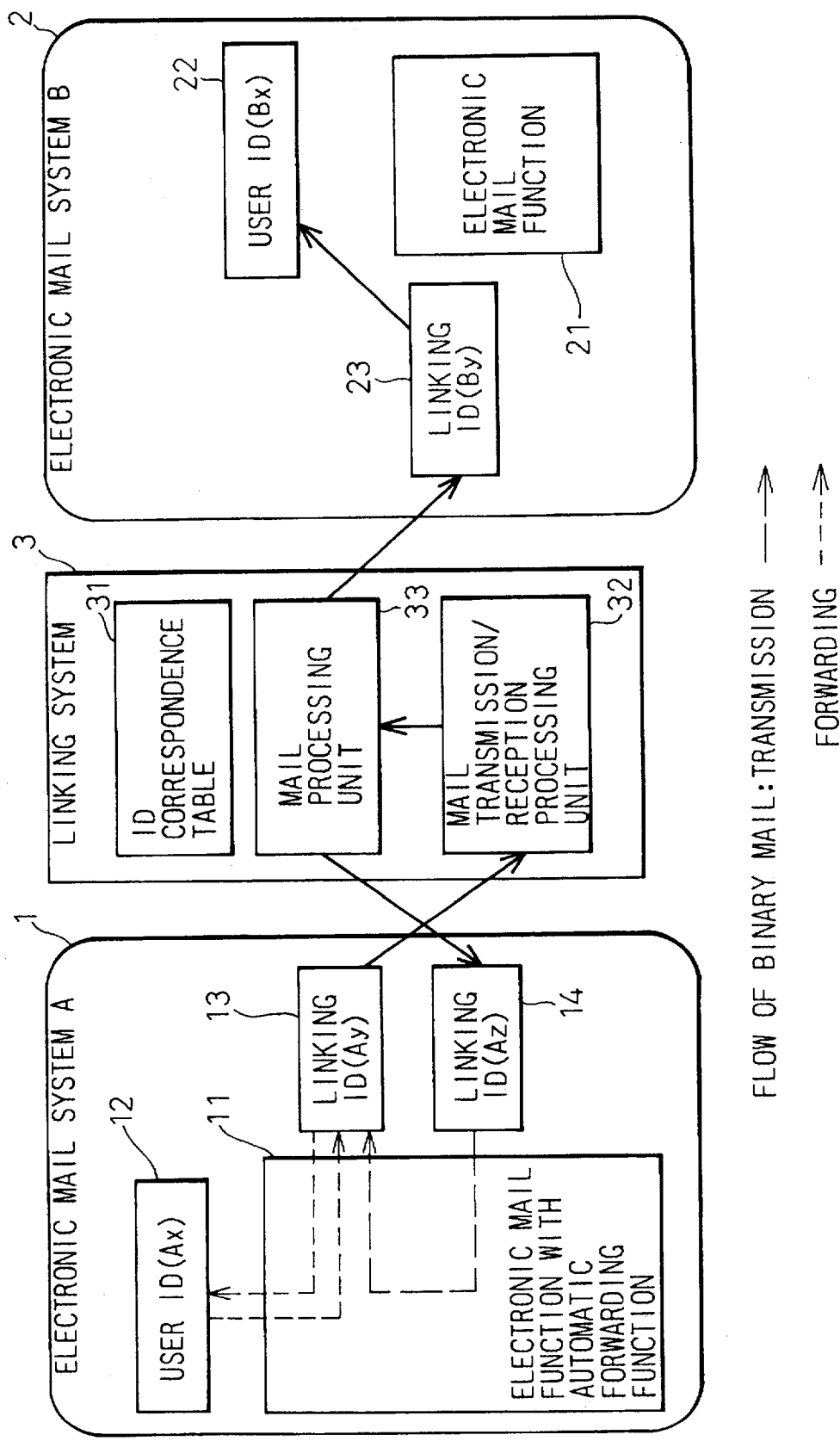

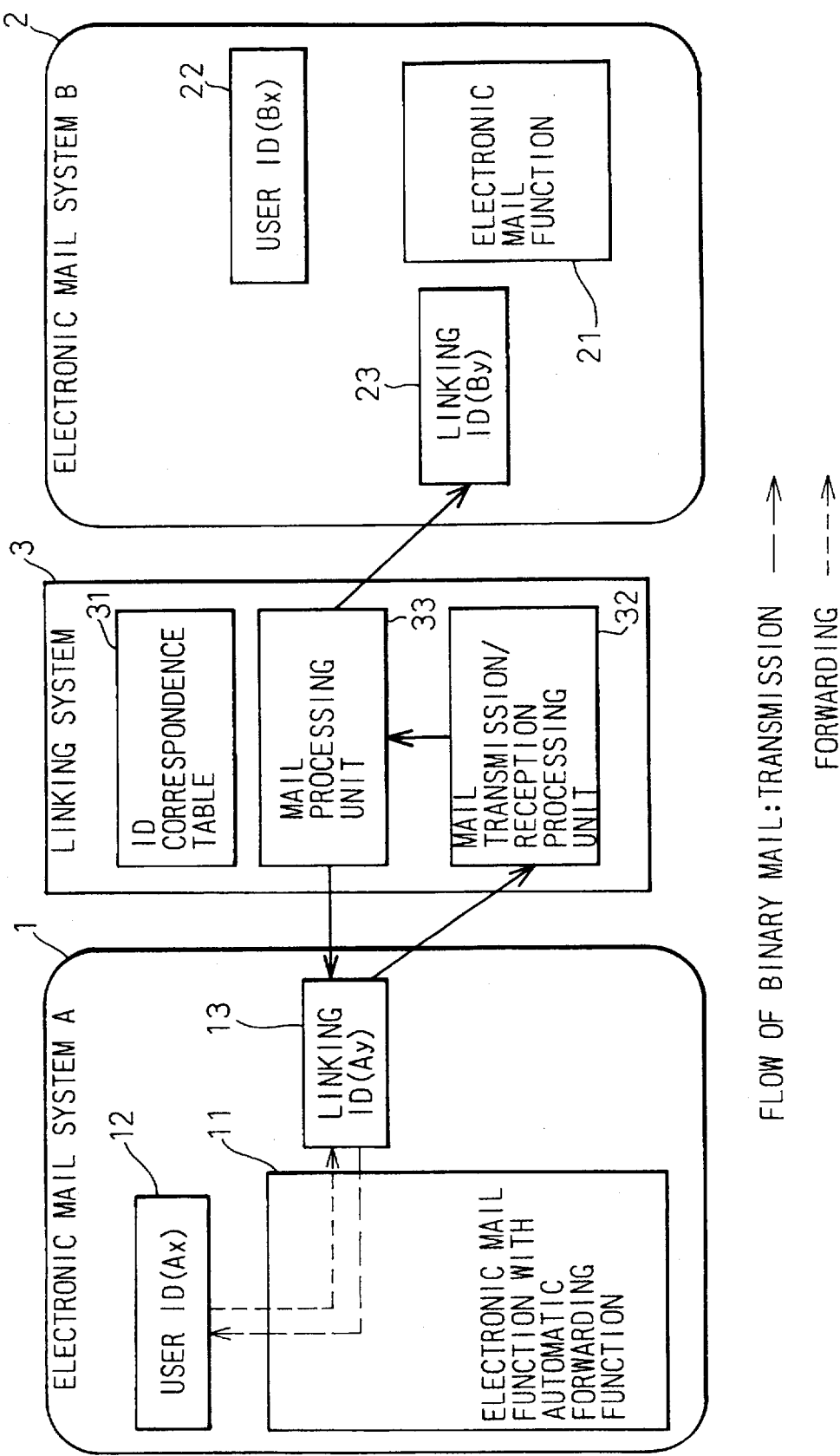

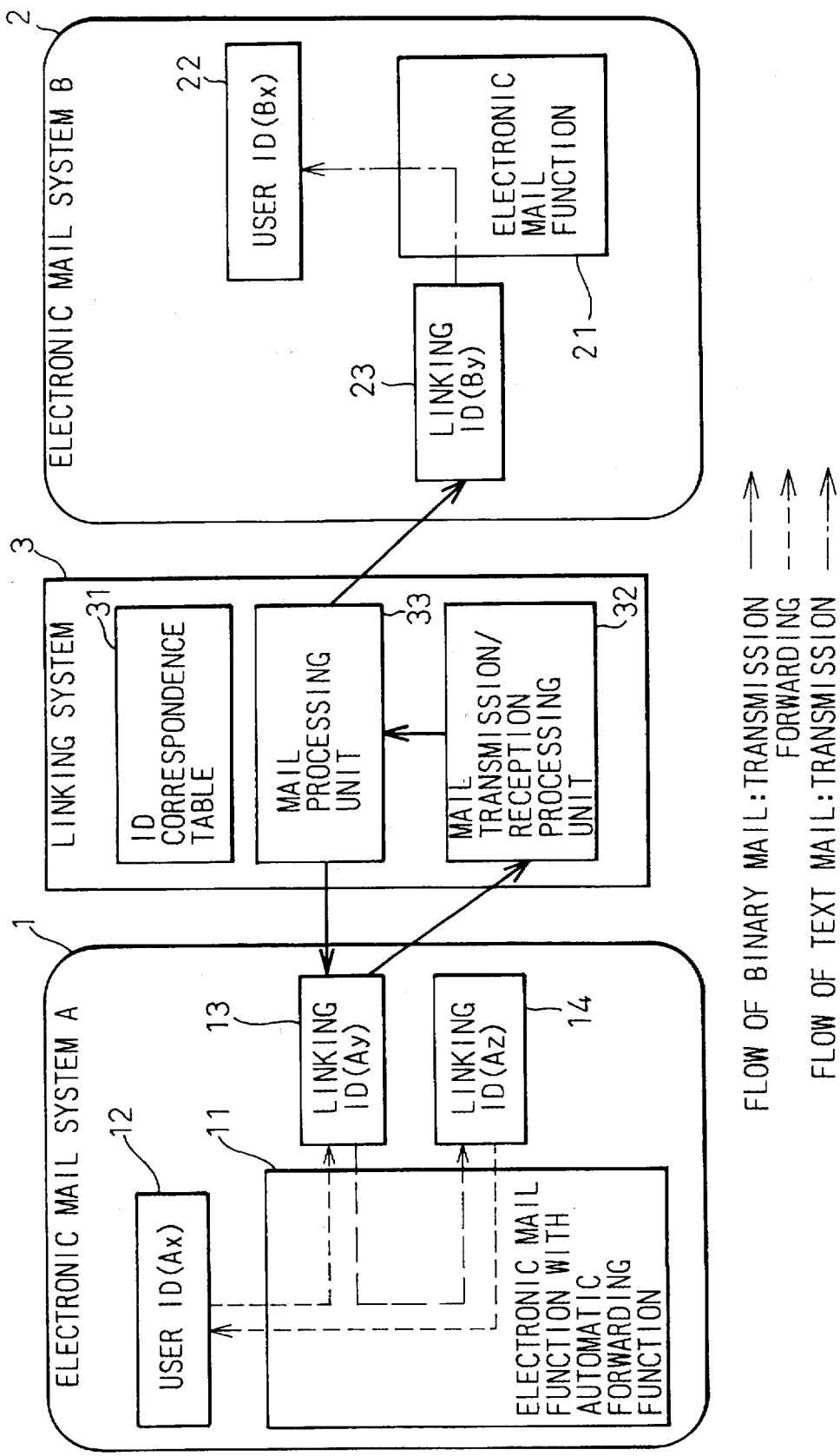

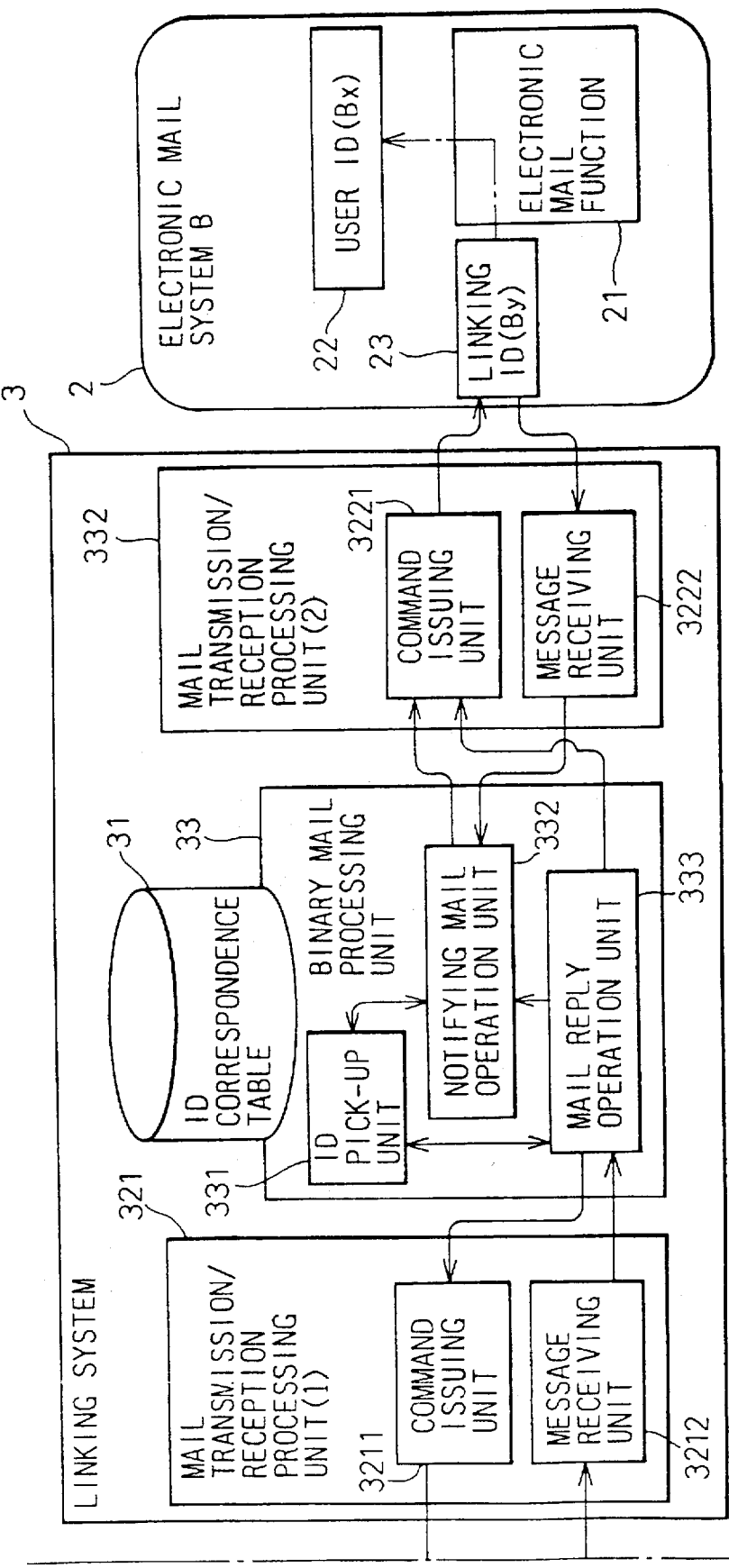

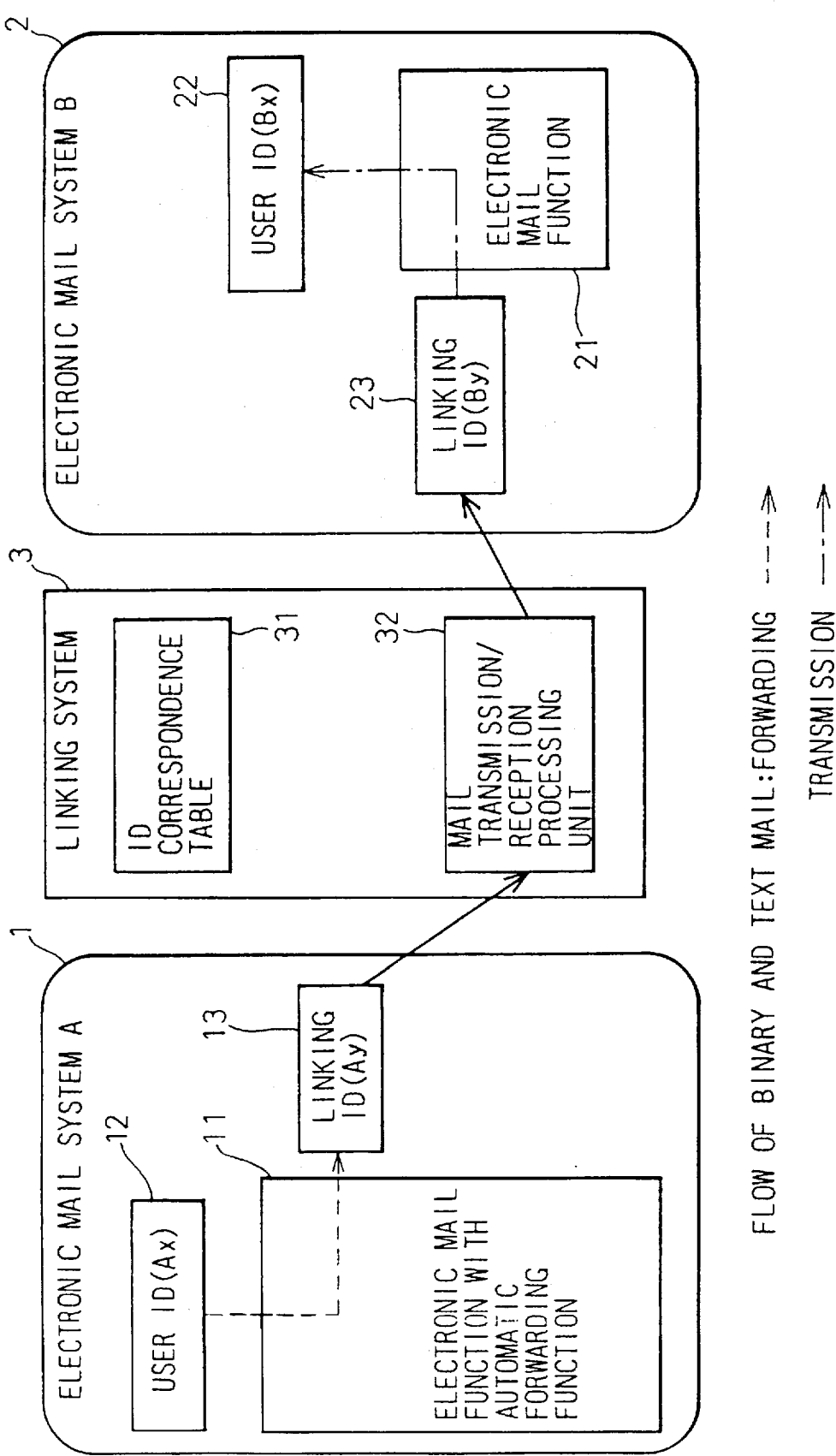

ELECTRONIC MAIL SYSTEM USING DOUBLE FORWARDING SUPPRESSING FUNCTION FOR ADMINISTRATING ELECTRONIC MESSAGE THAT HAVING DATA FORMAT THAT CAN NOT BE HANDLED AT DESTINATION SIDE

BACKGROUND OF THE INVENTION

1. Field of the Invention

The present invention relates to a method of administrating electronic messages in linking electronic mail systems at the time of forwarding electronic mail through electronic mail systems handling electronic mail in different data formats.

2. Description of the Related Art

Electronic mail communication is a service available via computer networks or personal computer communications and is extensively used as an information transmission means.

Technology has also been realized according to which a plurality of different electronic mail systems can be linked together through a linking system, and mail in an electronic mail system can be forwarded to another electronic mail system via the linking system. When a user is a subscriber to a plurality of electronic mail systems, the electronic mail messages in the electronic mail systems addressed to the user can be intentionally and collectively forwarded to a particular electronic mail system that is frequently used by the user.

FIG. 5 illustrates a conventional linking system for forwarding electronic mail messages through a plurality of different independent electronic mail systems which is taught, for example, in Japanese Patent Application No. 3-014055. In FIG. 5, reference numerals 1 and 2 denote electronic mail systems different from each other, and 3 denotes a linking system for linking the electronic mail systems 1 and 2 together.

Here, let it be assumed that a user ID(Ax) is an ID (identifier) of a user X in an electronic mail system 1, a linking ID(Ay) is an ID of the linking system 3 in the electronic mail system 1, a linking ID(Bx) is a user ID at a destination in the electronic mail system 2 to where mail from the user X will be forwarded, and a linking ID(By) is an ID of the linking system 3 in the electronic mail system 2.

The electronic mail systems 1 and 2 are each provided with an electronic mail function for transmitting electronic mail message from one user ID means 12 having the user ID(Ax) in one electronic mail system A to another user ID means 22 having the user ID(By) in another electronic mail system B, and the electronic mail system 1 is further provided with a function for automatically forwarding the electronic mail. The automatic forwarding function automatically forwards the electronic mail message addressed to the user ID means 12 of one user X in one electronic mail system to another user ID means 22 that has been set in advance in the same electronic mail system.

The linking system 3 is equipped with an ID correspondence table 31 which contains relationships between user ID means at the sources and user ID means at the destinations when electronic mail message is to be forwarded from one electronic mail system to another electronic mail system, and with a mail transmission/reception processing unit 32.

According to this electronic mail administrating system, the linking system 3 forwards electronic mail messages arriving, for example, at the user ID means serving as a buffer or a memory having ID as ID(Ax) in the electronic mail system 1 to the user ID means also serving as a buffer or a memory having ID as ID(BX) that has been set in advance by the user, in another electronic mail system 2, by utilizing a function for automatically forwarding the electronic mail message in the electronic mail system.

For example, in a conventional electronic mail system 1, it is previously set that an electronic mail message received by a user ID means serving as a message receiving means 12, having user ID(Ax) should be automatically forwarded to a linking ID means 13 controlled by the linking system 3 and having the linking ID, i.e., ID(Ay). Therefore, electronic mail message addressed to the user ID means 12 having ID(Ax) of an user X that has arrived from another user, is forwarded to the linking ID means 13 having the linking ID(Ay). The electronic mail linking system 3 receives electronic mail message from the linking means 3 having the linking ID(Ay) of the electronic mail system 1, picks up the ID(Ax) of the source side from the header information of the electronic mail, learns the user ID means 22, having the user ID(Bx) of the destination by retrieving it from the ID correspondence table 31, and transmits the electronic mail message to the receiving user ID means 22 having the user ID(BX) at the destination via the linking ID means 23 having the linking ID(By) of the linking system 3 in the electronic mail system 2. Thus, the mail can be forwarded between different electronic mail systems.

Attention must be given when this automatic forwarding function is to be utilized. For instance, in the electronic mail system 1, when the message received by the user ID means 12, having the ID(Ax) has been set to be forwarded to the linking ID means 13 having the ID(Ay) and the message received by the means 13 having the ID(Ay) has been set to be forwarded to the user ID means 12 having the ID(Ax), electronic mail message forwarded to the user ID means 13 having ID(Ay) from the means 12 having user ID(Ax), is forwarded to the user ID means 12 from linking ID means 13, each serving as a data buffer or memory and is forwarded again by the user ID means 12 to the linking ID means 13, establishing a loop in which the electronic mail is forwarded endlessly. This includes such a complex case in that when an electronic mail message is repeatedly forwarded between the above-mentioned two means, the message may be passed through a means again, through which the message has passed previously, causing this operation to be endless loop.

In order to avoid a loop, therefore, many electronic mail systems employ (1) a method of suppressing double forwarding or (2) a method of stopping an electronic mail message from being forwarded again to user ID means or linking ID means through which the message has once passed.

According to the former method of suppressing double forwarding, the electronic mail message is inhibited from being forwarded two times consecutively. For instance, when it is designated to forward the electronic mail message to one ID means having a given ID and when the electronic mail message is forwarded to the ID means, the electronic mail message, that is forwarded is inhibited from being forwarded to another ID means. That is, for example, even when the electronic mail message was once forwarded, from the user ID means 12 having ID(Ax) to the linking ID means 13 having ID(Ay) and when the electronic mail message is about to be forwarded again from the linking ID means 13 having ID(Ay) to the user ID means 12 having ID(Ax), this designation is neglected.

According to the latter method of stopping electronic mail message being forwarded to the ID means through which the electronic mail message has once passed, the ID means through which the electronic mail message has passed is written into the header of the electronic mail message every time the electronic mail message is forwarded. When it is detected, based upon the ID information of the header, that the ID at the destination of forwarding is the one through which the electronic mail message has once passed when a given ID is forwarding the electronic mail message, the forwarding is stopped.

In the above description, the practical linking system forwards the electronic mail message in bi-directional communication system formed between the electronic mail system 1 and the electronic mail system 2. In FIG. 5 and in the description of the invention mentioned later, however, the electronic mail is forwarded from the electronic mail system 1 to the electronic mail system 2 in order to simplify the description.

In many electronic mail systems, the electronic mail messages handled in the systems have data in different formats. In order to exchange the electronic mail among the electronic mail systems having different data formats, therefore, the electronic mail linking system executes a code conversion on electronic mail (e.g., conversion from JIS code into shifted code) or a format conversion.

In, for example, binary mail (facsimile data, etc.), binary mail that arrives at an electronic mail system (e.g., electronic mail system 1) that can handle it, can be forwarded to an electronic mail system (e.g., electronic mail system 2) that cannot handle binary mail. In the electronic mail system 2 which is the destination of forwarding the binary mail cannot be restored or even if it could be restored, the data would become meaningless. In the conventional linking system, however, no particular attention is given to such an event, and the binary mail is simply forwarded even to an electronic mail system that cannot handle the binary mail. As a result, it often happens that a user is not informed of the fact that electronic mail having a different data format has been forwarded to him.

SUMMARY OF THE INVENTION

The present invention was accomplished in view of the above-mentioned problems, and its object is to provide a method for administrating electronic mail messages in linking electronic mail systems handling data in different formats, the electronic mail message is held in the memory or buffer means such as the user ID means having the user ID that is the source of forwarding the electronic mail message and, besides, this fact is noticed to the user at the destination to which the message is to be forwarded, by utilizing a function for suppressing double forwarding of electronic mail message or a function for stopping the electronic mail message from being forwarded to the another data buffer or data memory means having the ID through which it has once passed when it is requested to forward an electronic mail message the data format of which cannot be handled by the electronic mail system to which the message to be forwarded.

In order to achieve the above-mentioned object, the method for administrating electronic messages in linking electronic mail systems of the present invention basically employs the technical method described below.

The method for administrating electronic messages involves linking an electronic mail systems comprising a linking system, an electronic mail system which is a forwarding side having a function for suppressing a double-forward of the message, connected to the linking system, and an electronic mail system which is the destination to which the message to be forwarded, and in which linking ID means controlled by the linking system, are set in each of the electronic mail systems, and wherein an electronic mail message forwarded to the linking ID means from the user ID means of the electronic mail system of the forwarding side, is forwarded to a linking ID means of opposite electronic mail system of the destination to which the message to be forwarded, through the linking system, the improvement wherein at least two linking ID means are arranged at least in the electronic mail system of the forwarding side and when it is judged that the electronic mail message forwarded from electronic mail system of the forwarded side, has a data format that cannot be handled by the electronic mail system of the destination side to which the message to be forwarded, the linking system of the forwarding side, transmits the electronic mail message, forwarded to a first linking ID means provided in the electronic mail system of the forwarding side, to a second linking ID means provided in the same electronic mail system, and transmits again the electronic mail message from the second linking ID means to the user ID means of the same electronic mail system.

BRIEF DESCRIPTION OF THE DRAWINGS

FIG. 1(A) is a diagram illustrating the principle of the present invention (utilizing a function for suppressing double forwarding);

FIG. 1(B) is a block diagram illustrating the constitution of a method of linking electronic mail according to another embodiment of the present invention;

FIG. 2 is a diagram illustrating the principle of a further embodiment of the present invention (utilizing a function for stopping electronic mail from being forwarded to an ID through which it has already passed);

FIG. 3 is a diagram illustrating the principle according to a still further embodiment of the present invention (which notifies the electronic mail system to which the electronic mail is forwarded);

FIGS. 4(A) and 4(B) are diagrams illustrating a linking system which executes the method of linking electronic, mail according to the embodiment of the present invention; and FIG. 5 is a diagram illustrating a conventional linking system.

DETAILED DESCRIPTION OF THE PREFERRED EMBODIMENTS

Figure 4A:
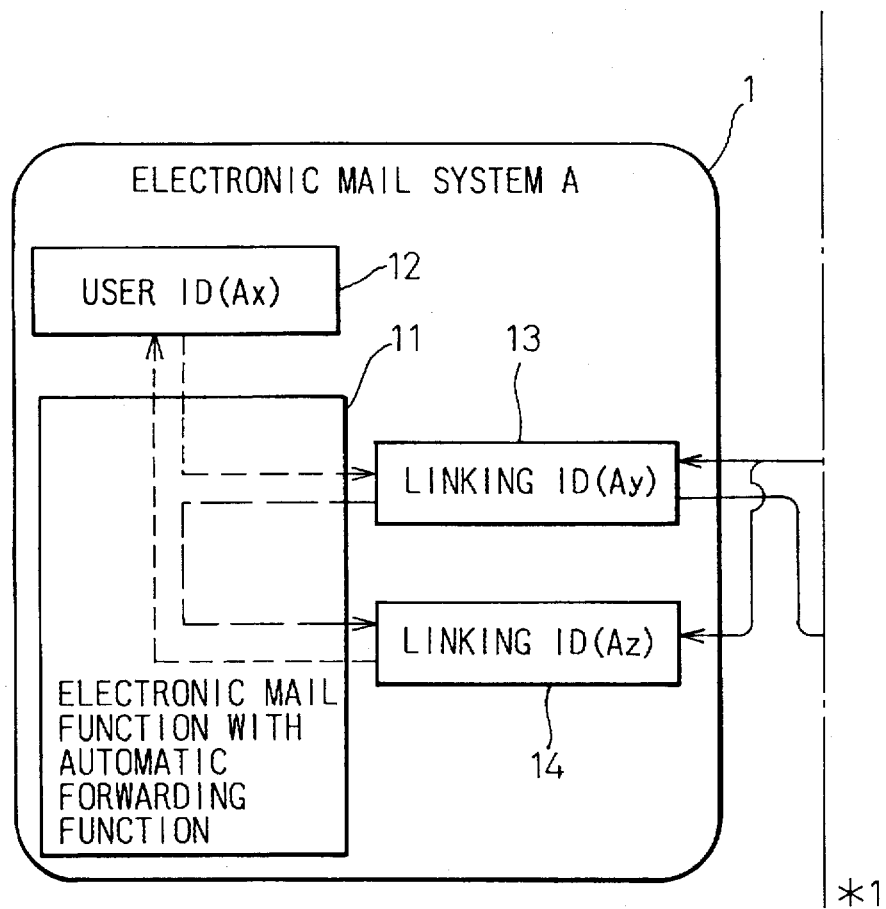

An embodiment of a system for administrating electronic messages in linking electronic mail systems according to the present invention will now be described in detail with reference to the drawings.

FIG. 1 to 3 are diagrams illustrating the principle according to the present invention.

In order to solve the above-mentioned problems according to one aspect of the present invention as shown in FIG. 1(A), there is provided a method for administrating electronic mail messages in linking electronic mail systems comprising a linking system 3, an electronic mail system 1, which is the forwarding side having a double forward-suppressing function connected to the linking system 3, and an electronic mail system 2 which is the destination side to which the message to be forwarded, and in which linking ID means 13, 23 controlled by the linking system 3 are provided in each of the electronic mail system 1 of the forwarding side and the electronic mail system 2 of the destination side, respectively, and electronic mail message forwarded to the linking ID means 13 from a user ID means 12 of the forwarding source in the electronic mail system 1 which is the forwarding side is forwarded to a user ID means 22 of the destination of forwarding, via the linking ID means 23, in the electronic mail system 2 of the destination side, the improvement wherein at least two linking ID means 13 and 14 are arranged in at least the electronic mail system 1 of the forwarding side, and when the electronic mail message forwarded from the electronic mail system 1 of the forwarding side has a data format that cannot be handled by the electronic mail system 2 of the destination side to which the message should be forwarded, the linking system 3 transmits the electronic mail message forwarded to the first linking ID means 13 in the electronic mail system 1 of the forwarding side to the second linking ID means 14 in the electronic mail system 1 of the forwarding side and forwards again the electronic mail message from the second linking ID means 14 to the user ID means 13 of the forwarding side.

According to another aspect of the present invention, as shown in FIG. 1(B) the basic construction thereof is similar to those as shown in FIG. 1(A), when it is judged that the electronic mail message forwarded from the electronic mail system 1 which is the forwarding side is of a data format that cannot be handled by the electronic mail system 2 which is the destination side, the linking system 3 temporarily stores in its mail transmission/reception processing unit 32, the electronic mail message that is forwarded to the first linking ID means 13 in the electronic mail system 1 of the forwarding side, and then transmits said electronic mail message to the second linking ID means 14 in the electronic mail system 1 of the forwarding side, after that transmits said electronic mail message from the second linking ID means 14 to the first linking ID means 13, and then forwards said electronic mail message from the first linking ID means 13 to the user ID means 12 of the forwarding side.

According to a further aspect of the present invention as shown in FIG. 2, there is provided a system for linking electronic mail systems wherein linking ID means 13 and 23 controlled by the linking system 3 are provided in each of the electronic mail system 1 of the forwarding side having a function 11 for suppressing the forwarding to the ID means to which the electronic mail message has been forwarded, and the electronic mail system 2 of the destination side, and the electronic mail message forwarded to the linking ID means 13 from a user ID means 12 provided in the forwarding side in the electronic mail system 1 is forwarded to a user ID means 22 in the electronic mail system 2 of the destination side to which the message should be forwarded via the linking ID 23, the improvement wherein when the electronic mail message forwarded from the electronic mail system 1 of the forwarding side has data of a format that cannot be handled by the electronic mail system 2 of the destination side, the linking system 3 transmits to the user ID means 12 as a destination of forwarding, the electronic mail message that is forwarded to the linking ID means 13 from the user ID means 12 in the electronic mail system 1 of the forwarding side.

According to a still further aspect of the present invention as shown in FIG. 3, there is provided a method for administrating the electronic messages in linking an electronic mail systems wherein when the linking ID means 13 in the electronic mail system 1 of the forwarding side has received the electronic mail message of a data format that cannot be handled by the electronic mail system 2 of the destination side, a notifying message that notifies this fact is transmitted to the user ID means 22 of the destination side to which the message should be forwarded in the electronic mail system 2 by using means 21 having a suitable electronic mail function.

According to an aspect of the present invention, there is provided a linking system having at least two linking ID means 13 and 14 in an electronic mail system 1 that has a function for suppressing double forwarding, comprising:

a mail transmission/reception processing unit 32 having a function for determining whether or not an electronic mail message forwarded to the first linking ID 13 has a data format that can be handled by an electronic mail system 2 of the destination side to which the message should be forwarded; and a mail processing unit 33 which, when said mail transmission/reception processing unit 32 judges that the electronic mail cannot be handled by the electronic mail system 2 of the destination side, designates the second ID means 14 which is separated from the first linking ID means 13 to forward the electronic mail message to the user ID means 12 which is the source that has forwarded the electronic mail message as a destination to which the message should be forwarded and so controls said first linking ID means 13 as to transmit said electronic mail message to the second linking ID means 14.

That is, when the electronic mail stored in the first linking ID means 13 is to be transmitted to the second linking ID means 14 according to the above-mentioned embodiment, it is not allowed to transmit new electronic mail message from the first linking ID means 13 to the second linking ID means 14 if the old electronic mail message is stored in the second linking ID means 14. Therefore, the electronic mail message that has been stored in the second linking ID means 14 must be transmitted to the user ID means 12 so that the memory of the second linking ID means 14 becomes empty and, then, the required electronic mail message must be transmitted from the first linking ID means 13 to the second linking ID means 14. Thereafter, the second linking ID means 14 forwards the electronic mail message received from the first linking ID means 13 to the user ID means 12.

According to another aspect of the present invention, there is provided a linking system wherein the mail processing unit 33 designates the first linking ID means 13 to forward the electronic mail message to the user ID means 12 that is the source of forwarding the electronic mail message instead of designating the first linking ID means 13 to forward the electronic mail message to the second linking ID means 14, and controls the second linking ID means 14 so as to transmit the electronic mail message to the first linking ID means 13.

This embodiment is based upon the same technical idea as that of the aforementioned embodiment. In transmitting the electronic mail message from the second linking ID means 14 to the first linking ID means 13 in the system of FIG. 1(B), in particular, the memory of the first linking ID means 13 must be rendered empty. For this purpose, a step is provided to transmit the electronic mail information stored in the first linking ID means 13 to the user ID means 12.

According to a further aspect of the present invention, there is provided an administrating electronic messages in linking electronic mail systems comprising a mail transmission/reception processing unit 32 having a function for judging whether or not an electronic mail message forwarded to a linking ID means in an electronic mail system having a function for suppressing the forwarding to the ID means to which the electronic mail message has been forwarded, can be handled by an electronic mail system which is the destination to where the electronic mail message is forwarded, and a mail processing unit 33 which, when said mail transmission/reception processing unit 32 judges that the electronic mail cannot be handled by the electronic mail system of the destination to where it is forwarded, controls said linking ID means to transmit the electronic mail message to the user ID means which is the source side of forwarding the electronic mail message.

According to a still further aspect of the present invention, there is provided a linking system comprising an ID correspondence table 31 in which is stored a user ID of the destination that corresponds to a user ID of the forwarding source wherein, when a mail transmission/reception processing unit 32 renders the judgement that an electronic mail message cannot be handled by the destination electronic mail system, a mail processing unit 33 forms a notifying mail message for notifying this fact, and transmits said notifying mail message from a linking ID means in the electronic mail system of the destination side to a user ID means of the destination side, retrieved from the ID correspondence table 31.

Referring to FIG. 1(A), the electronic mail system 1 has a function for suppressing double forwarding. The user ID means having ID as ID(Ax) of the user X has been designated to forward the electronic mail message, and the electronic mail message transmitted to the user ID means 12, identified by the user ID(Ax), is automatically forwarded to the linking ID means 13 identified by the linking ID(Ay) which is controlled by the linking system 3 in the electronic mail system 1. Here, it is presumed that the electronic mail system 1 handles the electronic mail message (such as binary data, facsimiles and the like) of a data format that cannot be handled by the electronic mail system 2.

It is now presumed that the electronic mail message forwarded to the linking ID means 13 having an identification number as ID(Ay) of the linking system 3 from the user ID means 12 having the user ID(Ax) is binary data.

(1) In the linking system, the mail transmission/reception processing unit 32 judges that the electronic mail message received by the linking ID means 13 having the linking ID(Ay) is binary mail.

(2) While being controlled by the mail processing unit 33, another linking ID means 14 having the identification number as ID(Az) controlled by the linking system 3 in the electronic mail system 1, is designated to forward the electronic mail message to the user ID means 12 having ID(Ax) as an identification number, and the electronic mail message is transmitted from the linking ID means 13 having ID(Ay) as an identification number to the linking ID(Az) 14, i.e., the linking ID means 14 having an ID number of ID(Az).

(3) The linking ID(Az) 14 forwards the electronic mail that is received to the user ID means 12 having the user ID(Ax).

(4) The user ID means 12 having the user ID as ID(Ax) has been designated to forward the electronic mail message that is received to the linking ID means 13 having the linking ID(Ay). Here, however, the electronic mail message from the linking ID(Az) means 14, having linking ID as is a forwarded mail, and it is not allowed to forward it consecutively to another ID means due to the function for suppressing double forwarding. Accordingly, the designation of forwarding is neglected, and the electronic mail message (binary data) that is received stays at the user ID means 12 having user ID as ID(AX) which is the forwarding source.

In the above-mentioned method of linking electronic mail systems, the binary data received by the linking ID means 13 having ID as ID(Ay) is transmitted to the linking ID means 14 having ID as ID(Az), and is then forwarded from the linking ID means 14 having ID(Az) to the user ID means 12 having ID(Ax). The present invention, however, is in no way limited thereto only. That is, as shown in FIG. 1(B), the linking system 3 may once down-load the binary data received by the linking ID means 13 having ID(Ay) in its own station 3, designate the linking ID means 13 having ID(Ay) to forward the electronic mail message to the user ID means 12 having ID(Ax), transmit the down-loaded electronic mail message to the linking ID means 14 having ID(Az), transmit a binary data from the linking ID means 14, having ID(Az) to the linking ID means 13 having ID(Ay) and may, then, forward it from the linking ID means 13 having ID(Ay) to the user ID means having ID(Ax).

In FIG. 2, the electronic mail system 1 is suppressing forwarding to an ID means through which an electronic mail has once passed. Similarly to the above-mentioned case, furthermore, the user ID means 12 having ID(Ax) of the user X has been designated to forward the electronic mail to the linking ID means 13 having ID(Ay). Here, furthermore, the electronic mail system 1 handles the electronic mail message (binary data in this case) in a format that cannot be handled by the electronic mail system 2.

It is now presumed that the electronic mail forwarded from the user ID means 12 having ID(Ax) to the linking ID means having ID(Ay) of the linking system 3 is binary data.

(1) In the linking system, the mail transmission/reception unit 32 judges that the electronic mail message received by the linking ID means 13 having ID(Ay) is binary data.

(2) Then, being controlled by the mail processing unit 33, the electronic mail message forwarded to the linking ID means 13 having ID as ID(Ay) is transmitted from the linking ID means 13 having ID(Ay) to the user ID means 12 having ID(Ax) which is the forwarding side.

(3) The user ID means 12 having ID(Ax) has been designated to forward the electronic mail message that is received by the linking ID means 13 having ID(Ay). However, since the linking ID means 13 having ID(Ay) is the same linking ID means (source of transmission) through which the electronic mail has once passed, the designation of forwarding is neglected. Accordingly, the electronic mail message (binary data) stays at the user ID means 12 having ID(Ax) which the forwarding side.

FIG. 3 illustrates a system similar to that of FIG. 1 wherein, when the electronic mail message received by the linking ID means 13 having ID(Ay) is binary, the binary data is returned to the user ID means 12 having ID(Ax) which is the forwarding side, and the mail processing unit 33 in the linking system 3 picks up the user ID means 12 having ID as ID(Ax) which is the forwarding side from header information of the binary mail message and searches the ID correspondence table 31 to obtain a user ID(Bx) of the user ID means 22 at a destination of forwarding in the electronic mail system 2 which is the destination of forwarding. Then, for example, a notifying mail message (e.g., an electronic mail message of a form that can be handled by the electronic mail system 2, such as a text data, etc.) stating that "the binary mail message is returned to the user ID means 12 having ID as ID(Ax)", is transmitted from a linking ID means 23 having ID(By) in the electronic mail system 2 to the user ID means 22 having user ID means having ID(Bx) at the destination of forwarding in the electronic mail system 2.

Then, the user reads the notifying mail message received by the user ID means 22 having ID(Bx), learns the fact that the binary mail is held in the user ID means 12 having ID as ID(Ax) in the electronic mail system 1 and makes access to the electronic mail system 1 to obtain the binary mail from his own user ID means 12 having ID as ID(Ax). Thus, the user is liberated from the need to regularly check his electronic mailbox in the electronic mail system 1 to which access is rarely made.

The method of FIG. 3 can similarly be adapted even to the system of FIG. 2.

An embodiment of the present invention will now be described with reference to the drawings.

FIGS. 4(A) and 4(B) illustrate a system for carrying out the method for administrating electronic mail messages in linking electronic mail systems according to an embodiment of the present invention. In this embodiment, the binary data is held at the user ID means 12 which is the forwarding side by using the function for suppressing double forwarding, and this fact is notified to the user ID means 22 at the destination of forwarding in the electronic mail system which is the destination of forwarding.

In the drawing, the circuits denoted by the same reference numerals as those of FIGS. 1 to 3 are circuits having functions equivalent to those of FIGS. 1 to 3. The electronic mail system 1 in the drawing has an automatic forwarding function as well as a function for suppressing double forwarding. The electronic mail system 1 is capable of handling binary data which, however, cannot be handled by the electronic mail system 2.

The linking system 3 is widely constituted by an ID correspondence table 31, a mail transmission/reception processing unit 32, and a binary mail processing unit 33.

The ID correspondence table 31 is a table in which are registered a user ID which is the forwarding side in the electronic mail system 1 and a user ID which is the destination of forwarding in the electronic mail system 2, which correspond to each other. In this embodiment, for instance, the user X has the user ID means 12 having ID(Ax) in the electronic mail system 1 and the user ID means 22 having ID as ID(Bx) in the electronic mail system 2, and the electronic mail arriving at the user ID means 12 having ID as ID(Ax) in the electronic mail system 1 is intentionally and collectively forwarded to the user ID means 22 having ID as ID(AX) in the electronic mail system 2. In this case, the user ID means 22 having ID as ID(Bx) is registered as a destination of forwarding being corresponded to the user ID means 12 having ID(Ax). The ID correspondence table 31 stores such correspondences in the form of a table in response to a request from the user who wants forwarding (linking) between electronic mail systems.

The mail transmission/reception processing unit 32 is constituted by a mail transmission/reception processing unit 321 for the electronic mail system 1 and a mail transmission/reception processing unit 322 for the electronic mail system 2. The mail transmission/reception processing unit 321 is constituted by a command issuing unit 3211 and a message receiving unit 3212. The command issuing unit 3211 has a function of sending a command for mail operation to the electronic mail system 1 through the linking ID means 13 having ID(Ay) or the linking ID means 14 having ID(Az), and the message receiving unit 3212 has a function of receiving a reply or a mail message from the electronic mail system 1.

The command issuing unit 3211 and the message receiving unit 3212 issue an electronic mail message (e.g., a reply to the binary data) to the electronic mail system 1 being controlled by a mail reply operation unit 333 that will be mentioned later. Moreover, the command issuing unit 3211 and the message receiving unit 3212 can access at a suitable timing (e.g., maintaining a predetermined time interval), to the electronic mail system 1 through the linking ID means 13 having ID as ID(Ay) to monitor whether there is a new electronic mail data or not.

The mail transmission/reception processing unit 322 is constituted by a command issuing unit 3221 and a message receiving unit 3222. The command issuing unit 3221 has a function of feeding a command for mail operation by accessing to the electronic mail system 2, through the linking means having ID as ID(By), and the message receiving unit 3222 has a function of receiving a reply from the electronic mail system 2.

The binary mail processing unit 33 is constituted by an ID pick-up unit 331, a notifying mail operation unit 332 and a mail reply operation unit 333.

When the electronic data received from the electronic mail system 1 is a text data, the mail reply operation unit 333 transmits the content thereof to the user ID means having ID(Bx) at the destination of forwarding from the linking ID means having ID(By) in the electronic mail system 2 through the command issuing unit 3221 of the main transmission/reception processing unit 322.

When the electronic data received from the electronic mail system 1 is a binary data, on the other hand, the mail reply operation unit 333 transmits the content thereof to the linking ID means having ID(Az) from the linking ID means having ID(Ay) in the electronic mail system 1 through the command issuing unit 3211 of the main transmission/reception processing unit 321. Prior to this, the linking ID means having ID(Az) has been designated to forward the electronic data to the user ID means having ID(Ax) which is the destination of forwarding. In the case of the binary data, furthermore, the notifying mail operation unit 332 is controlled to form a notifying message, and the content thereof is transmitted to the user ID means having ID(Bx) at the destination of forwarding from the linking ID means having ID(By) in the electronic mail system 2 through the command issuing unit 3221 of the mail transmission/reception unit 322.

The ID pick-up unit 331 has a function of picking up the user ID, ID(Ax) in this embodiment, which is the forwarding side from header information of the electronic data received from the electronic mail system 1, searching the ID correspondence table 31, and determining the user ID, ID(Bx) in this embodiment, which is the destination of forwarding in the electronic mail system 2. The ID pick-up unit 331 is started when the electronic mail message received from the electronic mail system 1 is a text data and when a user ID at the destination of forwarding is determined to forward the text data to the electronic mail system 2, and is started when the electronic data received from the electronic mail system 1 is a binary data and when a user ID at the destination of forwarding is determined to transmit the notifying mail to the electronic mail system 2.

Described below is the operation of the system of this embodiment.

The linking system 3 has a linking ID means having ID as ID(Ay) and a linking ID means having ID as ID(Az) in the electronic mail system 1 and, further, has a linking ID means having ID as ID(By) in the electronic mail system 2. Furthermore, the user ID means having ID as ID(Ax) in the electronic mail system 1 has been designated to forward the electronic mail to the linking ID means having ID(Ay) which is the destination of forwarding.

It is now presumed that a binary mail message has arrived at the user ID means having ID(Ax) of the user X from a user in the electronic mail system 1. The binary mail is forwarded from the user ID means having ID(Ax) to the linking ID means having ID(Ay).

The linking system 3 fetches the binary data that is forwarded to the linking ID means having ID(Ay), and the message receiving unit 3212 judges that it is a binary data. The judged result is notified to the mail reply operation unit 333 which then designates the linking ID means having ID(AX) through the command issuing unit 3211 to forward the binary data to the user ID means having ID(Ax) which is the destination of forwarding and, then, designates the linking means having ID(Ay) to forward the binary data to the linking ID means having ID(Az).

Therefore, the binary data forwarded to the linking ID means having ID(Ay) from the user ID means having ID(Ax) is then transmitted to the linking ID means having ID(Az) from the linking ID means having ID(Ay). Here, the binary data that is transmitted may be the one that is forwarded from the user ID means having ID(Ax) to the linking ID means having ID(Ay), that is stored in the linking ID means having ID(Ay) and is then transmitted, or may be the one that is once transferred from the linking ID means having ID(Ay) to the linking system 3 and is transmitted again through the linking ID means of ID(Ay).

The processing at the linking ID means of ID(Ay) is not forwarding but is transmission. Therefore, the binary data is not double-forwarded through the linking ID means of ID(Az), and the function for suppressing the double forwarding does not work. Accordingly, the linking ID means of ID(Az) automatically forwards the binary data that is received to a user ID means of ID(Ax) that has been designated to forward the binary data.

The user ID means of ID(Ax) has been designated to forward the binary data to the linking ID means of ID(Ay). However, the binary data that is received is the one that is forwarded from the linking ID means of ID(Az), and double forwarding occurs if the user ID means of ID(Ax) consecutively forwards the data that is forwarded. Therefore, the user ID means of ID(Ax) neglects the designation of forwarding to the linking ID means of ID(Ay) and holds the binary data.

Upon receiving from the mail reply operation unit 333 a notice that the mail message forwarded from the electronic mail system 1 is a binary data, the notifying mail message reply operation unit 332 checks the user ID means of ID(Ax) which is the forwarding source based upon header information of the binary mail, makes reference to the ID correspondence table 31 to retrieve the user ID means of ID(BX) at the destination of forwarding in the electronic mail system 2 that corresponds to the user ID means of ID(Ax), forms a notification message stating that the binary data has arrived at the electronic mail system 1, and transmits the content of the notification message from the linking ID(By) in the linking mail system 2, via the command issuing unit 3221, to the user ID(Bx) at the destination of forwarding retrieved in the ID correspondence table 31.

Upon looking at the notification message, therefore, the user X who frequently utilizes the electronic mail system 2 can learn that a binary mail message is arriving at the user ID means of ID(Ax) of the electronic mail system 1, and is allowed to obtain the binary mail from the user ID means of ID(Ax) by making access to the electronic mail system 1.

The present invention can be put into practice in a variety of modifications. In the above-mentioned embodiment, the linking system 3 has transmitted the binary data that is received from the linking ID means of ID(Ay) to the linking ID means of ID(Az) in the electronic mail system 1. The invention, however, is in no way limited thereto only but may be one in which the binary data forwarded from the user ID means of ID(Ax) to the linking ID means of ID(Ay) is down-loaded by the linking system 3 and is held therein, and is then transmitted from the linking ID means of ID(Az) to the linking ID means of ID(Ay) instead of transmitting it from the linking ID means of ID(Ay) to the linking ID means of ID(Az). Prior thereto, furthermore, the linking ID means of ID(Ay) may be so designated as to forward the binary mail to the user ID means of ID(Ax) which is the destination of forwarding.

Moreover, the electronic mail system 1 may be provided with a function for suppressing the forwarding to the ID through which the binary data has already passed instead of the function for suppressing the double forwarding. In this case, upon receiving the notice that the electronic mail that is received is a binary data, the mail reply operation unit 333 of the linking system 3 transmits the binary data from the linking ID means of ID(Ay) or the linking ID means of ID(Az) to the user ID means of ID(Ax) via the command issuing unit 3211. In this case, the user ID means of ID(Ax) has been so designated as to forward the binary data that is received to the linking ID means of ID(Ay). At this moment, however, the linking ID means of ID(Ay) is the ID through which the binary mail has already passed. Therefore, the user ID means of ID(Ax) suppresses the forwarding to the linking ID means of ID(Ay). As a result, the binary data is held at the user ID means of ID(Ax).

In linking an electronic data between the electronic mail systems handling data in different formats according to the present invention as described above, when it is requested to forward the electronic mail in a data format that cannot be handled by the electronic mail system at the destination of forwarding, the electronic mail is held at the user ID at the forwarding source by utilizing the function for suppressing double forwarding of the electronic mail system or the function for suppressing the forwarding to the ID through which the electronic mail has already passed. As required, furthermore, this fact is notified to the user ID at the destination of forwarding in the electronic mail system which is the destination of forwarding. Therefore, the user learns that the electronic mail message cannot be forwarded but has arrived at the electronic mail system without the need of regularly checking for electronic mail messages in the electronic mail system to which access is rarely made.

I claim:

1. A method for administrating electronic messages in linking an electronic mail systems, comprising:

a linking system, an electronic mail system which is a forwarding side having a double forwarding-suppressing function connected to said linking system, and an electronic mail system which is the destination to which the mail message to be forwarded, and in which linking ID means controlled by the linking system are set in each of the electronic mail systems, and wherein an electronic mail message forwarded to the linking ID means from the user ID means of the electronic mail system of the forwarding side, is forwarded to a linking ID means of opposite electronic mail system of the destination to which the message to be forwarded, through the linking system, wherein at least two linking ID means are arranged at least in the electronic mail system of the forwarding side and when it is judged that the electronic mail message forwarded from electronic mail system of the forwarded side has a data format that cannot be handled by the electronic mail system of the destination side to which the message to be forwarded, the linking system of the forwarding side transmits the electronic mail message forwarded to a first linking ID means provided in the electronic mail system of the forwarding side to a second linking ID means provided in the same electronic mail system, and transmits again the electronic mail message from the second linking ID means to the user ID means of the same electronic mail system.

2. A method for administrating electronic mails in linking an electronic mail systems according to claim 1, wherein when the linking ID means in the electronic mail system which is the forwarding side has received an electronic mail message in a data format that cannot be handled by the electronic mail system which is the destination of forwarding, the linking system transmits to the user ID means of the destination of forwarding in the electronic mail system which is the destination of forwarding a notifying message to notify the user that the electronic mail system which is the destination of forwarding has received a notifying message saying that it receive an electronic mail message data format of which cannot be handled thereby.

3. A linking system for carrying out the method for administrating electronic mails in linking an electronic mail systems according to claim 1, comprising:

a mail transmission/reception processing unit (32) having at least two linking ID means in an electronic mail system that has a function for suppressing double-forwarding and further having a function for determining whether an electronic mail message forwarded to the first linking ID means has a data format that can be handled by an electronic mail system of the destination to which the electronic mail message is forwarded; and a mail processing unit (33) which, when said mail transmission/reception processing unit judges that the electronic mail message cannot be handled by the electronic mail system of the destination to which it is forwarded, designates the second ID means which is separated from the first linking ID means to forward the electronic mail message to the user ID means that has forwarded the electronic mail message, and so works that said electronic mail message is transmitted from said first linking ID means to said second linking ID means and that said electronic mail message is transmitted from said second linking ID means to said user ID means of the source of forwarding.

4. A linking system according to claim 3, wherein said mail message processing unit 33 designates said first linking ID means to forward the electronic mail message to the user ID means that is the source of forwarding the electronic mail message, instructs said second linking ID means to transmit said electronic mail message to said first linking ID means, and further causes said electronic mail message to be transmitted from said first linking ID means to the user ID means of the forwarding side, instead of designating the first linking ID means to forward the electronic mail message to the second linking ID means.

5. A linking system according to claim 4, further comprising an ID correspondence table in which is stored a user ID of the destination of forwarding that corresponds to a user ID means of the forwarding side wherein, when a mail transmission/reception processing unit judges that an electronic mail message cannot be handled by an electronic mail system of the destination of forwarding, said mail processing unit forms a notifying information for notifying the user that the electronic mail message that is forwarded, cannot be handled by the electronic mail system of the destination of forwarding, and transmits said notifying information from a linking ID means in the electronic mail system of the destination of forwarding to the user ID means of the destination of forwarding retrieved by said ID correspondence table.

6. A linking system according to claims 3, further comprising an ID correspondence table (31) in which is stored a user ID of the destination of forwarding that corresponds to a user ID means of the forwarding side wherein, when a mail transmission/reception processing unit judges that an electronic mail message cannot be handled by an electronic mail system of the destination of forwarding, said mail processing unit forms a notifying information for notifying the user that the electronic mail message that is forwarded, cannot be handled by the electronic mail system of the destination of forwarding, and transmits said notifying information from a linking ID means in the electronic mail system of the destination of forwarding to the user ID means of the destination of forwarding retrieved by said ID correspondence table.

7. A method for administrating electronic messages in linking an electronic mail systems, comprising:

a linking system, an electronic mail system which is the forwarding side having a double forward-suppressing function connected to the linking system, and an electronic mail system which is the destination to which the message to be forwarded, and in which linking ID means controlled by the linking system are set in each of the electronic mail systems, and wherein an electronic mail message forwarded to the linking ID means from the user ID means of the electronic mail system of the forwarding source, is forwarded to a linking ID means of opposite electronic mail system of the destination to which the message to be forwarded, through the linking system, wherein at least two linking ID means are arranged at least in the electronic mail system of the forwarding side and when it is judged that the electronic mail message forwarded from electronic mail system of the forwarded side has a data format that cannot be handled by the electronic mail system of the destination side to which the message to be forwarded, the linking system stores the electronic mail forwarded in the first linking ID means in the electronic mail system which is the forwarding side, transmits said electronic mail message to the second linking ID means in the electronic mail system which is the forwarding side such that the electronic mail message is transmitted from said second linking ID means to said first linking ID means, and then forwards said electronic mail message from said first linking ID means to the user ID means of the forwarding side.

8. A linking system for carrying out the method for administrating electronic mails in linking an electronic mail systems according to claim 7, comprising:

a mail transmission/reception processing unit (32) having a function for judging whether or not electronic mail message forwarded to a linking ID means in an electronic mail systems having a function for suppressing the forwarding to the ID means to which the electronic mail message has already been forwarded, can be handled by an electronic mail system of the destination to which the electronic mail message is forwarded; and a mail processing unit (33) which, when said mail transmission/reception processing unit 32 judges that the electronic mail message cannot be handled by the electronic mail system of the destination to which it is forwarded, controls said linking ID means to transmit said electronic mail message to the user ID means which is the source of forwarding the electronic mail message.

9. A linking system according to claim 8, further comprising an ID correspondence table in which is stored a user ID of the destination of forwarding that corresponds to a user ID means of the forwarding side wherein, when a mail transmission/reception processing unit judges that an electronic mail message cannot be handled by an electronic mail system of the destination of forwarding, said mail processing unit forms a notifying information for notifying the user that the electronic mail message that is forwarded, cannot be handled by the electronic mail system of the destination of forwarding, and transmits said notifying information from a linking ID means in the electronic mail system of the destination of forwarding to the user ID means of the destination of forwarding retrieved by said ID correspondence table.

10. A method for administrating electronic mails in linking an electronic mail systems according to claim 7, wherein when the linking ID means in the electronic mail system which is the forwarding side has received an electronic mail message in a data format that cannot be handled by the electronic mail system which is the destination of forwarding, the linking system transmits to the user ID means of the destination of forwarding in the electronic mail system which is the destination of forwarding a notifying message to notify the user that the electronic mail system which is the destination of forwarding has received a notifying message saying that it receive an electronic mail message data format of which cannot be handled thereby.

11. A linking system according to claim 8, further comprising an ID correspondence table in which is stored a user ID of the destination of forwarding that corresponds to a user ID means of the forwarding side wherein, when a mail transmission/reception processing unit judges that an electronic mail message cannot be handled by an electronic mail system of the destination of forwarding, said mail processing unit forms a notifying information for notifying the user that the electronic mail message that is forwarded, cannot be handled by the electronic mail system of the destination of forwarding, and transmits said notifying information from a linking ID means in the electronic mail system of the destination of forwarding to the user ID means of the destination of forwarding retrieved by said ID correspondence table.

12. An apparatus for linking electronic mail systems including the capability to forward a message, said system comprising:

an originating mail system forwarding to a destination mail system, the originating mail system and the destination mail system being coupled via a linking system, the originating mail system having a first linking ID unit, a second linking ID unit, a user ID unit, when it is determined that a data format of the message formed at the originating mail system is not compatible with a data format of the destination mail system, the linking system transmits the message transmitted to the first linking ID unit to the second linking ID unit, and the message from the second linking ID unit is again transmitted to the user ID unit within the originating mail system.

13. An method of forwarding a message from an originating mail system to a destination mail system via a linking system, the originating mail system including at least two linking ID units used for suppressing double forwarding, comprising the steps of:

(a) determining whether a data format of the message formed at the originating mail system is compatable with a data format of the destination mail system, and (b) if the data formats as determined in step (a) are not compatable, then transmitting by the linking system the message transmitted to the first linking ID unit to the second linking ID, and then transmitting the message from the second linking ID unit to the user ID unit.

* * * * *

UNITED STATES PATENT AND TRADEMARK OFFICE
CERTIFICATE OF CORRECTION

PATENT NO. : 5,751,960
DATED : May 12, 1998
INVENTOR(S) : Ryotaro MATSUNAGA

It is certified that error appears in the above-identified patent and that said Letters Patent is hereby corrected as shown below:

Col. 2, line 4, change "BX" to --Bx--;
 line 24, change "BX" to --Bx--.

Col. 16, line 25, change "An" (first occurrence) to --A--.

Signed and Sealed this

Eighth Day of September, 1998

Attest:

BRUCE LEHMAN

*Attesting Officer*  *Commissioner of Patents and Trademarks*